Sept. 24, 1963 E. S. SEVERINSSON 3,104,532
DEVICES FOR JOINING PILE SECTIONS
Original Filed Sept. 23, 1957 2 Sheets-Sheet 1

INVENTOR.
ERIK SÖLVE SEVERINSSON
BY
ATTORNEYS

Sept. 24, 1963  E. S. SEVERINSSON  3,104,532
DEVICES FOR JOINING PILE SECTIONS
Original Filed Sept. 23, 1957  2 Sheets-Sheet 2

INVENTOR.
ERIK SÖLVE SEVERINSSON
BY
Linton and Linton
ATTORNEYS 3,104,532
DEVICES FOR JOINING PILE SECTIONS
Erik Sölve Severinsson, Karrlundsgatan 23,
Goteborg, Sweden
Continuation of application Ser. No. 685,710, Sept. 23,
1957. This application Oct. 31, 1960, Ser. No. 66,103
Claims priority, application Sweden Sept. 24, 1956
7 Claims. (Cl. 61—53)

Figure 1:
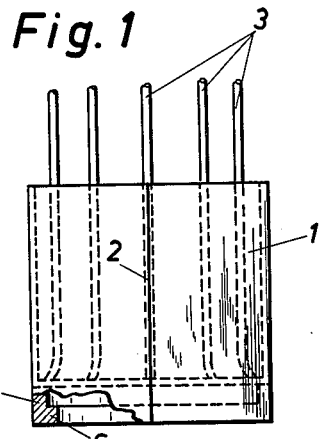
Figure 5:
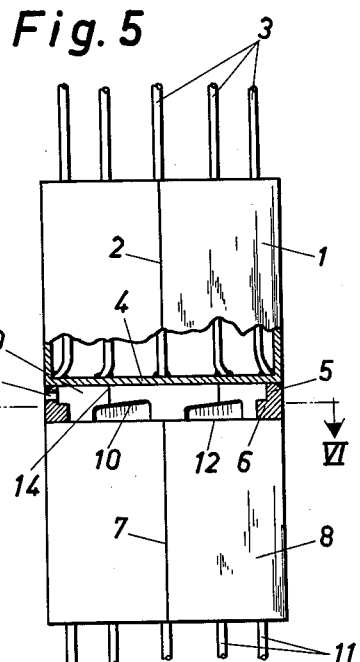
Figure 2:
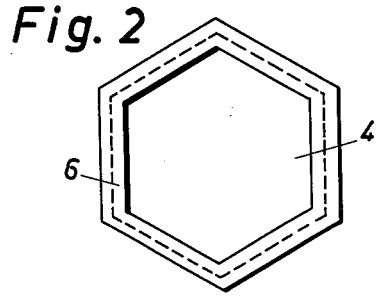
Figure 3:
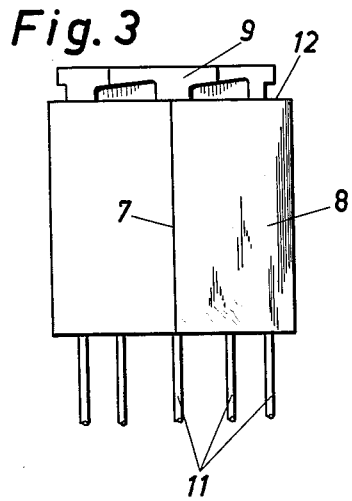
Figure 6:
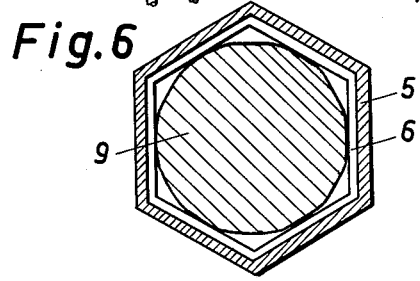
Figure 4:
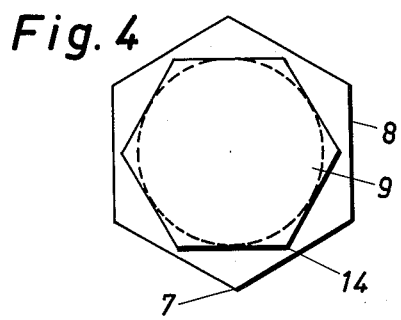
Figure 7:
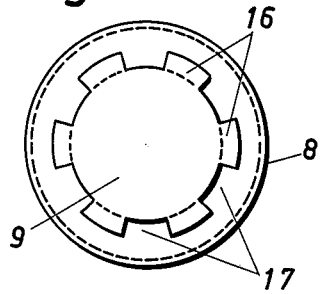
Figure 8:
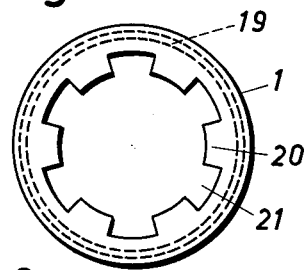
Figure 9:
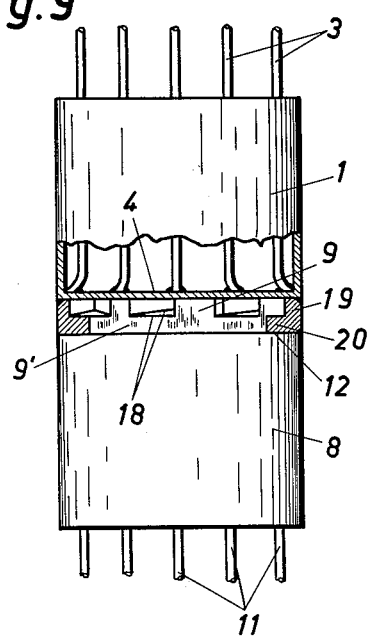
Figure 10:
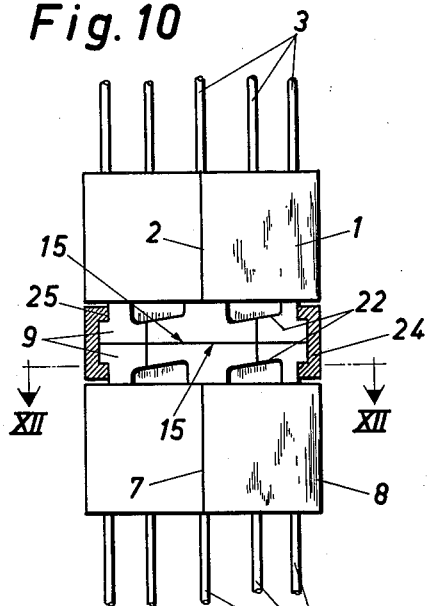
Figure 11:
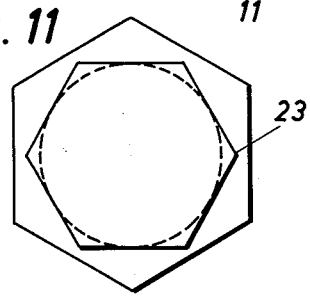
Figure 12:
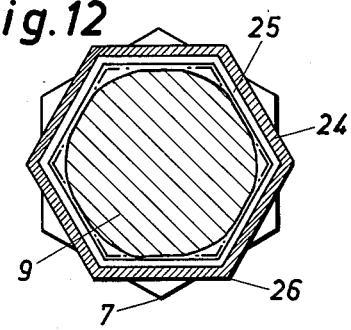

The present invention relates to a device for joining pile sections and has for its object to provide a device of this kind which will enable a quick and efficient joining of such sections. A further object of the invention is to provide a device of said kind which will be simple in construction and cheap in manufacture. Other objects of the invention will be made clear by the following description with reference to the accompanying drawings showing, as examples, some embodiments of the invention. In the drawings, FIG. 1 is a side elevation of an end part of the device having a coupling member in the form of a fixed gripping sleeve which is shown partially in section. FIG. 2 is an end view of the same part. FIG. 3 is a side view of the other end part of the device having another coupling member in the form of a fixed gripping head. FIG. 4 is an end view of the latter part. FIG. 5 is a side view of the two end parts connected, the gripping sleeve and adjacent portion of the pertaining end part being shown in axial section. FIG. 6 is a section on the line VI—VI of FIG. 5. FIGS. 7 and 8 are end views of a gripping head and a gripping sleeve respectively according to a second embodiment of the invention. FIG. 9 is a side elevation of the members of FIGS. 7 and 8 in coupled position. FIG. 10 is a side elevation of two coupled end parts having fixed gripping heads connected by a common gripping sleeve. FIG. 11 is an end view of one of these gripping heads and FIG. 12 is a section on the line XII—XII of FIG. 10. In FIGS. 9 and 10 some portions are shown in axial section. The present application is a continuation of applicant's United States application Serial No. 685,710 filed September 23, 1957 and now abandoned.

Referring now first to the embodiment shown in FIGS. 1–6, 1 denotes one end part of the device providing a hood shaped member having a fixed coupling member in the form of a gripping sleeve, said end part having, for example, the shape of a hood intended to enclose and be attached to the lower end of a pile section. The gripping sleeve 5 is anchored to the reinforcing rods 3 of the concrete pile section (not shown) and extends axially from the plane end wall or bottom 4 of the end part 1. The gripping sleeve has the same circumferential shape as the cross-section of the pile or the end part 1 respectively. Said shape in the present example is a regular hexagon and is provided with an inwardly directed flange 6 the inner contour of which also has the shape of a regular hexagon.

The other hood-shaped end part 8 has the same cross-section as the end part 1 and has a coupling member in the form of a gripping head 9 on the end wall 12 facing the end part 1, said head having a smaller cross-section or extension in radial direction than the part 8. The corners of the head 9, according to the example shown, are so directed that an axial plane through any corner of the gripping head 9 intersects a side surface of the end part 8 along the center line of said surface, as is evident by FIG. 4. The corners of the gripping head 9 are undercut to form an engaging surface 10 at each corner, said surface forming an angle to a radial plane of the end part 8. The gripping head 9 is fixedly anchored to the reinforcing rods 11 of the other concrete pile section and extends axially from the plane end wall or surface 12 of the part 8.

When the end parts of two pile sections are to be joined, the end part 1 with the fixed gripping sleeve 5 is lowered over the fixed gripping head 9 of the end part 8 in which movement the corners 2 of the end part 1 are located in the same axial planes as corresponding corners 14 of the gripping head 9 which will abut against the end wall 4 of the upper end part 1 whereas the gripping sleeve 6 will abut against the end surface 12 of the lower end part 8. By turning the one end part 1 about 30 degrees about the axis of the pile or the axis of the sleeve 5 or head 9 respectively, the flange 6 of the gripping sleeve 5 will engage with the undercut corners of the gripping head 9. The turning is effected until the corners 2 and 7 are located in the same axial planes whereby the engaging surfaces 10 in co-operation with the corresponding engaging surfaces of the flange 6 will force the coupled parts together so that they by friction will be held together. The parts are secured in this mutual position by one or more stop screws 13 or other suitable means. The gripping head 9 fits exactly in the opening formed by the inwardly directed flange 6 of the sleeve 5 on account of which the gripping sleeve and the gripping head may be cut out from a common work piece in a common operation without any loss of material, and upon undercutting of the corners of the piece 9 they are then fixedly united with their respective end parts. The oblique undercut engaging surfaces 10 of the gripping head forming a suitable angle to a radial plane may, instead, be provided on the flange 6 or on this flange as well as on the gripping head.

In the embodiment of FIGS. 7–9 the end parts 1 and 8 have a cylindrical shape and the undercut portions of the coupling member or gripping head 9 are formed by tongues 16 extending outwardly substantially radially from the periphery of the head and having equal width and located with equal interspaces 17 between each other. These tongues are undercut with oblique surfaces 18 forming an angle to a radial plane. The other coupling member or gripping sleeve 19 is provided with inwardly extending radial tongues 20 separated by interspaces 21. These interspaces 21 fit to the tongues 16 of the gripping head and the tongues 20 of the gripping sleeve fit to interspaces 17 of the gripping head so that, when the end walls of the parts 1 and 8 are moved together the tongues 16 may pass through the interspaces 21 and the tongues 20 through the interspaces 17, and by mutual rotation of the parts 1 and 8 a small angle (according to the embodiment shown about 30 degrees) about the common axis line of the parts 1 and 8, the tongues 20 will engage with the undercut and oblique surfaces 18 of the tongues 16 whereby the end parts 1 and 8 are coupled and forced against each other. In tightened position the coupling is locked by means of screws not shown.

Also in this embodiment, the gripping head 9 forms a male member and the gripping sleeve 19 forms a female member which may be cut out from the same work piece and after undercutting of the tongues are fixedly anchored to their respective end parts.

In the embodiment of FIGS. 10–12 two hexagonal end parts 1 and 8 each provided with a fixed hexagonal gripping head are coupled by means of a movable gripping sleeve 24 enclosing the heads and having two flanges 25. In joining the parts, the gripping sleeve 24 is first moved over the gripping head 9 of the lower end part 8 as shown in FIG. 12. After that, the gripping head 9 of the other end part 1 from above is inserted into the gripping sleeve until the plane end surfaces 15 of the gripping heads 9 lie close together and the corners 2 and 7 of the end parts are aligned. The gripping sleeve 24 is then turned about 30 degrees in clockwise direction whereby the gripping flanges 25 thereof will engage with the undercut surfaces of the corners 23 and in co-operation therewith will force the plane surfaces 15 of the heads close to each other. The turning is continued until the corners 26 of the gripping sleeve arrive in the same axial plane as the corners 2 and 7 respectively of the end parts 1 and 8 whereby a butt joint is obtained.

As is evident by the description and drawings each half of the joint or coupling will present by the end wall 4 and gripping head 9 or by the gripping heads 9 and 9 respectively, abutting surfaces rigidly anchored to corresponding concrete pile section, by preference by welding to the longitudinal reinforcing irons 3, 11 of each section. Also the frame-shaped coupling sleeve or collar 5 (FIG. 1) or 19 (FIG. 9) is rigidly anchored to corresponding pile section by preference by welding to the longitudinal reinforcing iron 3 of the section. Said abutting surfaces (15 in FIG. 10) are horizontal, i.e. perpendicular to the axis of the pile and extend over most portion of the cross-sectional surface of the pile (not shown). The concrete pile has the same cross-sectional size and peripheral configuration as that of the hoods so that the outer faces of the pile and hoods are flush with each other. The same is the case as regards the coupling sleeve or collar 5 or 19 or 24 which in operative position will embrace peripherically the flat gripping head (FIGS. 5 and 9) or heads 9 (FIG. 10) and is positioned in the space between the end walls or bottoms of the hood-shaped members 1 and 9. The inwardly projecting flanges, tongues or projections 6, 20, 25 of said sleeve or collar in operative position engage with the outwardly projecting undercut corners, tongues or projections 14, 16, 23 of the gripping head or heads 9.

In a pile joint according to this invention the abutting parts or members of the joint are rigidly anchored to the pertaining pile sections, and by the hammering operation the co-operating parts of the joint will be compressed whereby the joining property of the joint or coupling will be improved. Since the abutting surfaces of the joint are rigidly connected to the reinforcing irons of the pile sections the shocks caused by the hammering operation will be propagated through the pile with little or no loss of energy. Thus the abutting parts of the joining device will constitute a "membrane" between the ends of the pile sections, said "membrane" permitting the pressure wave arising in the pile by the driving operation to be transmitted through substantially the whole cross-sectional area of the pile from pile section to pile section without being noticeably reflected or distorted. A joining device of this kind will not become impaired by fatigue also in extremely hard driving operation. When made from ordinary steel or other suitable metal the flexural rigidity and bending strength of the joint are of the same size as or even superior to corresponding qualities of the pile proper.

The invention is not limited to the embodiments above described. For example, each of the end parts may be provided with a fixed gripping sleeve and the coupling of these sleeves may be effected by means of a double acting gripping head adapted to be turned in relation to the end parts and operating substantially according to the same principle as described above with reference to the embodiments shown in the drawings.

In order to guide the end parts when they are moved together for coupling, the gripping head or the gripping sleeve may be provided with a centrical, axially projecting, conical guide pin adapted to project into a corresponding hole in the other coupling member (the gripping sleeve or the gripping head respectively), said pin in co-operation with the wall of said hole bringing the axis lines of the gripping head and the gripping sleeve to coincide.

What I claim is:

1. A device for joining concrete pile sections having reinforcing irons for said concrete pile sections comprising a pair of substantially hood-shaped rigid members of similar peripheral cross-sectional configuration, said hood-shaped members each having an end wall facing the corresponding end wall of the other of said hood-shaped members, said hood-shaped members each having a bore receiving an end of one of the pile sections and having the reinforcing irons of the pile section therein rigidly connected to the end wall of said hood-shaped member, a flat gripping head provided centrally on and rigidly connected to the end wall of at least one of said hood-shaped members, said gripping head projecting axially towards the end wall of the other of said hood-shaped members and having a smaller radial extension than that of said hood-shaped members providing a space between said end walls around the peripheral outside of said head, said gripping head being provided with a bearing surface located substantially in a radial plane thereof, a corresponding bearing surface being provided on the adjacent end of the other of said hood-shaped members, a coupling member having a peripheral cross-section and size corresponding to the peripheral cross-section of said hood-shaped members and being positioned in said space between said end walls peripherically enclosing said gripping head and connected to the other of said end walls, said gripping head having corners with undercut surfaces and said coupling collar having engaging surfaces for cooperating with said undercut surfaces for forcing said bearing surfaces against each other forming a butt joint with the pile sections connected to said hood-shaped members being thereby rigidly connected to each other upon mutual rotation of said gripping head and said coupling member a portion of a revolution about the axis of said coupling member.

2. A device for joining the adjacent ends of two reinforced concrete pile sections having longitudinal reinforcing irons, comprising a pair of pile sections, at least one central gripping head axially projecting from the end of one of said pile section, said gripping head being rigidly anchored to the reinforcing irons of its pile section and presenting an extreme flat abutting surface positioned substantially perpendicular to the axis of said pile, a member rigidly anchored to the reinforcing irons of the second of said pile sections and presenting an abutting surface facing said abutting surface of said gripping head and positioned substantially perpendicularly to the axis of said second pile, a coupling sleeve positioned between the ends of said pile sections and embracing said gripping head peripherically, said coupling sleeve having an internal configuration similar to the external configuration of said gripping head for mating with the latter so as to receive said gripping head when said pile sections are moved longitudinally towards each other, inwardly directed coupling portions being provided on said coupling sleeve, outwardly directed coupling portions being provided on said gripping head, said coupling portions upon mutual rotation of said gripping head and said coupling sleeve a portion of a revolution being adapted to interconnect said abutting surfaces in a close mutual position.

3. A device for joining a pair of rigid pile sections comprising a pair of substantially hood-shaped rigid members of similar peripheral cross-sectional configuration, said hood-shaped members each having an end wall facing the corresponding end wall of the other hood-shaped member, said hood-shaped members being capable of enclosing and being connected to respectively, adjacent ends of the two pile sections to be connected together, a flat gripping head provided centrally on and rigidly connected to the end wall of at least one of said hood-shaped members, said gripping head projecting axially towards the end wall of the other of said hood-shaped members and having a smaller radial extension than that of said hood-shaped members providing a space between said end walls around the peripheral outside of said gripping head and within the periphery of said hood-shaped members, said gripping head being provided with a bearing surface located substantially in a radial plane thereof and undercut surfaces on the periphery thereof, a corresponding bearing surface being provided on the adjacent end of the other hood-shaped member, a coupling member having a peripheral cross-section and size corresponding to the peripheral cross-section of said hood-shaped members being positioned in said space peripherically enclosing said gripping head and connected to the other of said end walls and said coupling member having inner engaging surfaces capable of engaging said undercut surfaces of said gripping head for forcing said bearing surfaces agianst each other and also said end walls forming a butt joint with the pile sections being rigidly connected to each other upon mutual rotation of said gripping head and said coupling member a portion of a revolution about the axis of said gripping head, said head having a polygonal outer circumferential shape with said undercut surfaces positioned at the corners thereof and said coupling member inner engaging surfaces for engaging said gripping head undercut surfaces being formed by an inwardly projecting edge of said coupling member having an inner periphery which has substantially the same form and size as the polygonal circumferential shape of said gripping head for mating therewith.

4. A device for joining the adjacent ends of two reinforced concrete pile sections having longitudinal reinforcing irons, comprising a pair of pile sections, a central gripping head of polygonal shape projecting axially from the end of one of said one pile sections, said gripping head being rigidly anchored to the reinforcing irons of its pile section and having a flat abutting surface positioned perpendicularly to the axis of its pile, a member rigidly anchored to the reinforcing irons of the second one of said pile sections and presenting an abutting surface corresponding to the abutting surface of said gripping head, a coupling member, said coupling member having inwardly projecting coupling portions capable of mating with said gripping head, the corners of said polygonal gripping head being undercut, whereby upon mutual rotation of said gripping head and said coupling member when mating will bring said coupling portions of said coupling member into engagement with the undercut corners of said gripping head for bringing said abutting surfaces in a close mutual position.

5. A device for joining the adjacent ends of two reinforced concrete pile sections having longitudinal reinforcing irons, comprising a pair of hood-shaped members each having a recess for receiving an end of one of the pile sections, said hood-shaped members having end walls facing each other and each being rigidly anchored to the reinforcing irons of one of said pile sections, a gripping head mounted on the end wall of one of said hood-shaped members and projecting axially from this end wall, a coupling member anchored to the end wall of the second of said hood-shaped members, said gripping member presenting an extreme flat abutting surface positioned perpendicularly to the axis of its pile section, the end wall of the first mentioned hood-shaped member inside said coupling member presenting a flat abutting surface corresponding to the abutting surface of said gripping head and also positioned perpendicularly to the axis of its respective pile, said coupling member adapted to embrace said gripping head peripherically between the end walls of said hood-shaped members for interconnection of said abutting surfaces in a close mutual position.

6. A device for joining rigid pile sections comprising a pair of substantially hood-shaped rigid members of similar peripherical cross-sectional configuration, each of said hood-shaped members including an end wall facing the corresponding end wall of the other hood-shaped member, said hood-shaped members being capable of enclosing and being connected to respectively, adjacent ends of two pile sections to be joined together, a flat end gripping head provided on and rigidly connected to the end wall of one of said hood-shaped members, said gripping head projecting axially towards the end wall of the other of said hood-shaped members and having a smaller radial extension than that of said hood-shaped members providing a space between said end walls around the peripheral outside of said gripping head, said gripping head having outwardly extending projections with interspaces therebetween and undercut engaging surfaces on said projections, a bearing surface on said gripping head located substantially in a radial plane thereof, a corresponding bearing surface provided on the adjacent end wall of the other of said hood-shaped members, a coupling member connected to the other of said hood-shaped members having a peripheral cross-sectional configuration corresponding to that of said hood-shaped members and positioned in said space, said coupling member having inwardly extending projections with interspaces therebetween corresponding to the periphery of said gripping head, said projections of said coupling member having engaging surfaces adapted to co-operate with said first mentioned engaging surfaces on said gripping head providing a rigid connection with a butt joint between said bearing surfaces by mutual rotation of said hood-shaped members a portion of a revolution about the axis of line of said coupling member.

7. A device for joining a pair of rigid pile sections comprising a pair of substantially hood-shaped rigid members of similar peripheral cross-sectional configuration, said hood-shaped members each having an end wall facing the corresponding end wall of the other hood-shaped member, said hood-shaped members being capable of enclosing and being fixedly connected to respectively, adjacent end of the two pile sections to be connected together, a pair of flat gripping heads each provided centrally on and rigidly connected to the end wall of one of said hood-shaped members, said gripping heads projecting axially of said hood shaped members and towards one another and having a smaller radial extension than that of said hood shaped members providing a space between said end walls around the peripheral outside of said gripping head and within the periphery of said hood-shaped members, each of said gripping heads being provided with a bearing surface located substantially in a radial plane thereof and peripheral corners with undercut surfaces, a coupling member having a peripheral cross-section corresponding to the peripheral cross-section of said hood-shaped members being positioned in said space peripherically enclosing said gripping head, said coupling member having a pair of inwardly projecting flanges each having engaging surfaces for mating with one of said gripping heads and entering said gripping head undercut surfaces upon rotation of said coupling member a portion of a revolution about the axis of said gripping heads and forcing said gripping head bearing surfaces against each other rigidly connecting said pile sections together.

References Cited in the file of this patent

UNITED STATES PATENTS

| 12,937 | Hicks | May 22, 1855 |
| 1,551,940 | Cooper | Sept. 1, 1925 |
| 1,947,743 | Schoeneck | Feb. 20, 1934 |

FOREIGN PATENTS

| 1,872 | Germany | Nov. 13, 1877 |